Figure 1:
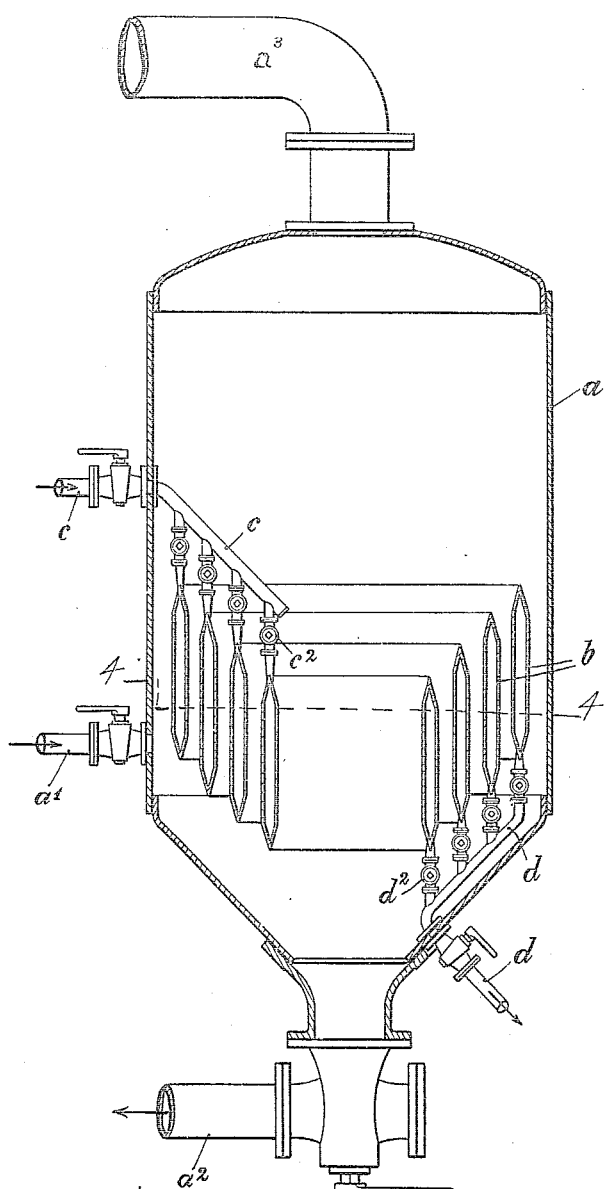

A. GRÄNTZDÖRFFER.
RADIATOR FOR VACUUM PANS.
APPLICATION FILED MAY 24, 1909.

953,607.

Patented Mar. 29, 1910.
2 SHEETS—SHEET 1.

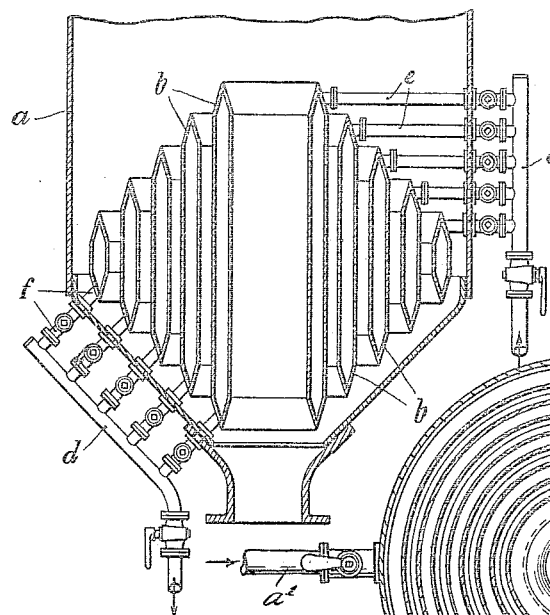
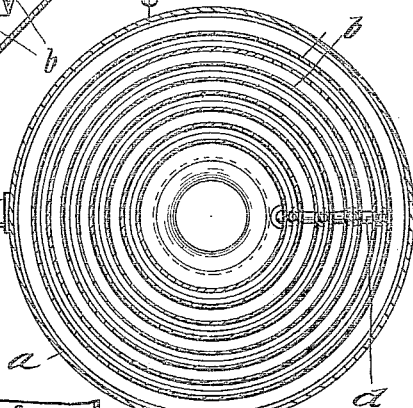
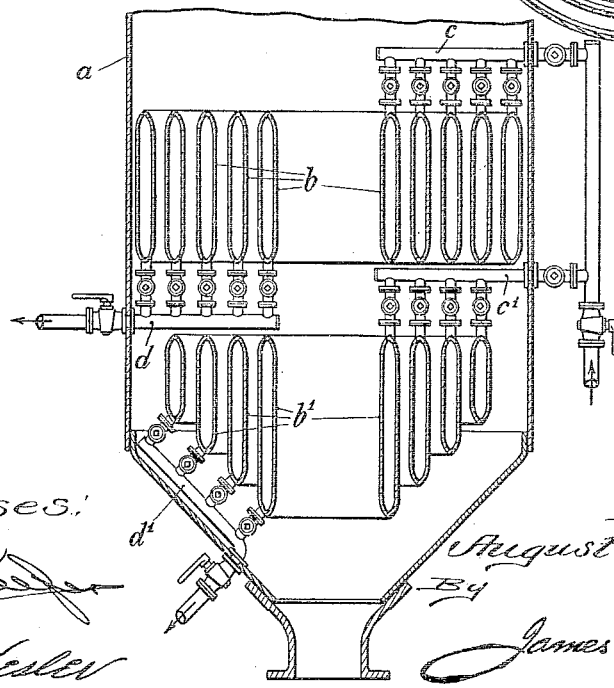

UNITED STATES PATENT OFFICE.

AUGUST GRÄNTZDÖRFFER, OF MAGDEBURG, GERMANY.

RADIATOR FOR VACUUM-PANS.

953,607. Specification of Letters Patent. Patented Mar. 29, 1910.

Application filed May 24, 1909. Serial No. 497,863.

*To all whom it may concern:*

Be it known that I, AUGUST GRÄNTZDÖRFFER, engineer, a subject of the Emperor of Germany, residing at Magdeburg, Province of Saxony, Prussia, Empire of Germany, have invented certain new and useful Improvements in Radiators for Vacuum-Pans, of which the following is a specification.

My invention relates to improvements in radiators for vacuum pans which are particularly designed for use in the manufacture of sugar. And the object of the improvements is to provide a radiator of this class, which is very effective as to heating properties, and which does not impair the circuit of the juices to be heated. For this purpose, my improved radiator is composed of a plurality of annular radiator elements concentrically located one within the other and disposed with their axes vertically.

For the purpose of explaining the invention, several examples embodying the same have been shown in the accompanying drawing, in which the same letters of reference have been used in all the views to indicate corresponding parts.

In said drawing, Figure 1, is a vertical cross-section of a vacuum pan provided with my improved radiator, the concentric radiator elements being made of the same height and disposed in stepwise relation, Fig. 2, is a similar cross-section of a pan provided with radiator elements the height of which increases from the wall of the apparatus toward the central part thereof, Fig. 3, is a similar cross-section of a pan provided with two sets of sectional radiators separately connected to independent steam supply and discharge pipes, and Fig. 4 is a horizontal sectional view through the apparatus on the line 4—4, Fig. 1.

Referring to the example illustrated in Fig. 1, the vacuum pan consists of a cylindrical vessel $a$ provided, in the usual way, with a supply $a^1$ and a discharge $a^2$ for the juice, and with a vapor eduction pipe $a^3$. The radiator consists of a plurality of annular elements $b$ concentrically located one within the other. As appears from the figure, the height of all the elements is the same, while their diameters decrease from the wall of the pan $a$ toward the center thereof. Each of the elements $b$ is connected to a steam supply pipe $c$ and a discharge pipe $d$, and in the preferred form of the apparatus, valves or cocks $c^2$ and $d^2$ are respectively provided in the connections between each of the radiator elements and the pipes $c$ and $d$, so that each element can separately be thrown out of operation if desired, and each element can readily be replaced by another one in case of repair being necessary.

To avoid any horizontal surfaces which would impair the flow of the juice within the vacuum apparatus, I prefer to make the radiator elements with tapering or rounded upper and lower ends. By the construction of the radiator, the circuit of the juice within the vacuum pan is furthermore improved because the elements $b$ separate the descending part of the juice from the ascending part, whereby the friction of the currents of juice moving in opposite directions is avoided.

As appears from Fig. 1, the radiator elements $b$ are so disposed relatively to one another, that their upper and lower ends are disposed on cones, the apices of which are directed toward the bottom of the apparatus.

In the example illustrated in Fig. 2, the radiator elements $b$ are made of different heights, and they are so disposed relatively to one another, that their upper ends are located on a cone the apex of which is directed upward, while the lower ends are disposed in the same way as in the example illustrated in Fig. 1. This construction of the radiator is preferable as compared to that of Fig. 1, because each element can conveniently be connected, through pipes $e$ and $f$, with pipes $c$ and $d$ for the supply and discharge of the steam, which are located at the outside of the pan $a$. Thereby, each element can separately be thrown in or out of operation without stopping the operation of the pan.

In Fig. 3 I have shown an example, in which the vacuum pan is provided with a plurality of superposed radiators of the character described. In the said example the upper and lower edges of the upper radiator and the upper edges of the lower radiator are respectively disposed in a horizontal plane, while the lower edges of the elements of the lower radiator are located on a cone, as described in the examples shown in Figs. 1 and 2. Each radiator is provided with separate connections $c$, $d$, resp. $c^1$, $d^1$ for the supply and discharge of the steam.

In apparatus of the character described, the most effective heating surfaces are those which are disposed vertically, because they do not impair the circuit of the juices which can move along the same while being gradually heated. They are also preferable, because they enable the juices to be readily withdrawn from the pan, while horizontal heating surfaces tend to arrest the juices.

I claim:

The combination with a vacuum pan of a radiator consisting of a plurality of vertical hollow annular shells, concentrically spaced, a steam supply pipe and a steam discharge pipe and connections between each pipe and the interior steam space of each shell, the said interior steam spaces being uninterrupted and the spaces between the shells being likewise uninterrupted.

In testimony whereof I have hereunto set my hand in presence of two subscribing witnesses.

AUGUST GRÄNTZDÖRFFER.

Witnesses:
 WILHELM LEHRKE,
 EMIL SCHÖNFELD.